(12) United States Patent
Coy et al.

(10) Patent No.: US 12,264,732 B1
(45) Date of Patent: Apr. 1, 2025

(54) STRAIN-WAVE GEAR ASSEMBLY HAVING CIRCUMFERENTIALLY SPACED APART BRIDGE CIRCUITS AND RELATED TECHNOLOGY

(71) Applicant: Agility Robotics, Inc., Pittsburgh, PA (US)

(72) Inventors: Jim Coy, Albany, OR (US); Andrew Abate, Albany, OR (US)

(73) Assignee: Agility Robotics, Inc., Pittsburgh, PA (US)

( * ) Notice: Subject to any disclaimer, the term of this patent is extended or adjusted under 35 U.S.C. 154(b) by 0 days.

(21) Appl. No.: 18/364,280

(22) Filed: Aug. 2, 2023

Related U.S. Application Data

(60) Provisional application No. 63/387,126, filed on Dec. 13, 2022.

(51) Int. Cl.
| | | |
|---|---|---|
| *F16H 49/00* | (2006.01) | |
| *F16H 57/01* | (2012.01) | |
| *G01L 1/22* | (2006.01) | |

(52) U.S. Cl.
CPC .......... *F16H 49/001* (2013.01); *F16H 57/01* (2013.01); *G01L 1/2262* (2013.01); *F16H 2049/003* (2013.01); *F16H 2057/012* (2013.01)

(58) Field of Classification Search
CPC .. F16H 49/001; F16H 57/01; F16H 2049/003; F16H 2057/012; G01L 1/2262
See application file for complete search history.

(56) References Cited

U.S. PATENT DOCUMENTS

| 11,874,191 B2 * | 1/2024 | Heim ..................... B25J 9/1025 |
| 2004/0079174 A1 * | 4/2004 | Horiuchi ............... G01L 3/1457 |
| | | 73/862.338 |
| 2010/0005907 A1 | 1/2010 | Kato et al. |
| 2022/0226993 A1 | 7/2022 | Madsen |

FOREIGN PATENT DOCUMENTS

| DE | 102018124685 A1 * | 4/2020 |
| DE | 102020131588 A1 * | 6/2022 |

OTHER PUBLICATIONS

Translation DE_102020131588 (Year: 2020).*
Translation DE 102018124685 (Year: 2020).*

* cited by examiner

*Primary Examiner* — Terence Boes

(57) ABSTRACT

A strain-wave gear assembly in accordance with at least some embodiments of the present technology includes a circular spline, a flexspline, and a wave generator operably associated with one another. Relative rotation between the flexspline and the wave generator causes relative rotation between the circular spline and the flexspline about an axis. The strain-wave gear assembly further includes a first bridge circuit configured to generate a first electrical signal corresponding to strain at a first portion of flexspline. The strain-wave gear assembly also includes a second bridge circuit configured to generate a second electrical signal corresponding to strain at a second portion of flexspline circumferentially offset from the first portion of the flexspline about the axis. The first bridge circuit includes a first resistor at the first portion of the flexspline. Similarly, the second bridge circuit includes a second resistor at the second portion of the flexspline.

18 Claims, 8 Drawing Sheets

STRAIN-WAVE GEAR ASSEMBLY HAVING CIRCUMFERENTIALLY SPACED APART BRIDGE CIRCUITS AND RELATED TECHNOLOGY

CROSS-REFERENCE TO RELATED APPLICATION

This claims the benefit of U.S. Provisional Application No. 63/387,126, filed Dec. 13, 2022. The foregoing application is incorporated herein by reference in its entirety. To the extent the foregoing applications or any other material incorporated by reference conflicts with the present disclosure, the present disclosure controls.

TECHNICAL FIELD

The present technology relates to strain-wave gear assemblies, such as strain-wave gear assemblies of robot actuators.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

DETAILED DESCRIPTION

Figure 1:
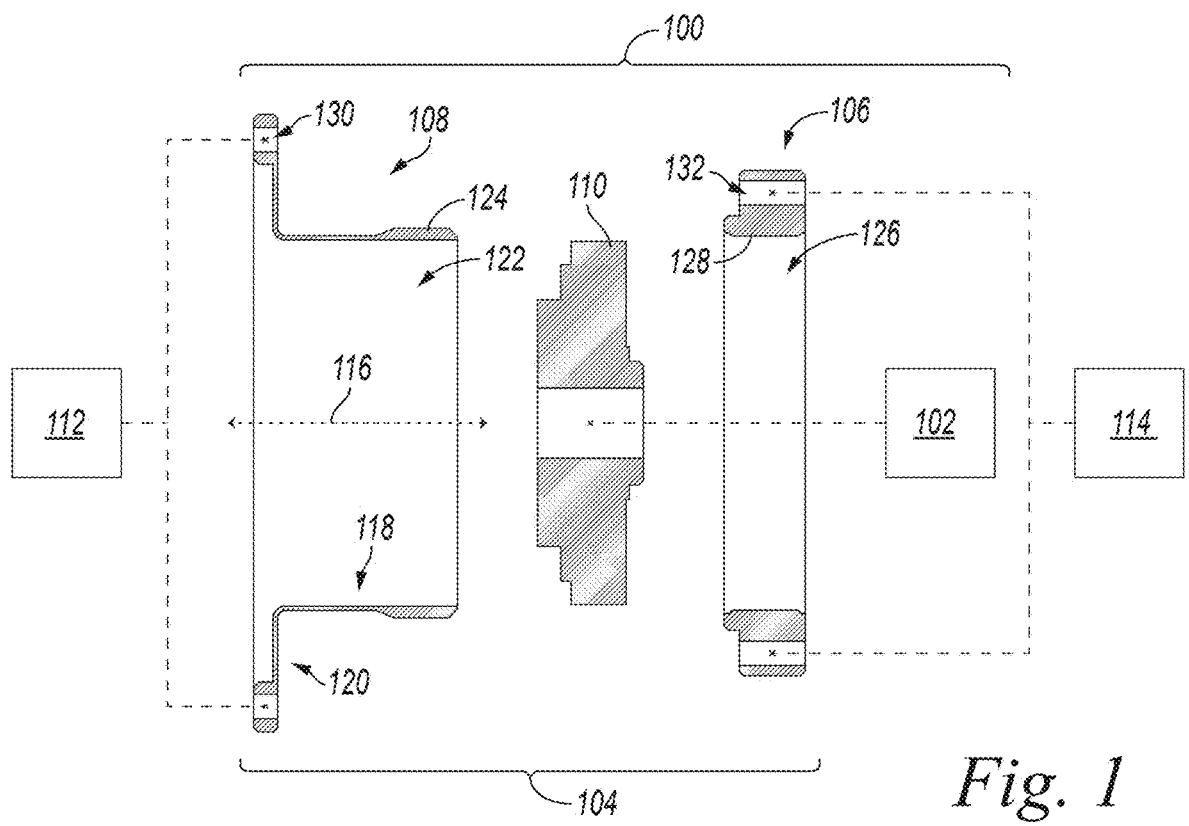
FIG. 1 is an exploded, midline cross-sectional side profile view of an actuator and associated structures in accordance with at least some embodiments of the present technology.

Robots perform mechanical work via actuators. A typical actuator in an electromechanical robot includes an electric motor and a gear assembly. The electric motor consumes electricity from a power source to rotate a shaft. In the absence of a load, the electric motor rotates the shaft at very high speed. The gear assembly decreases this speed, thereby causing the output from the actuator to be more suitable for application to a controlled mechanical action, such as moving a robot link via a robot joint. There are several types of gear assemblies with different advantages and disadvantages. Strain-wave is one type that is often well suited to use in robotics. Strain-wave gear assemblies tend to exhibit high gear reduction ratios in a compact form, which can facilitate fine control over robot movements. Relatedly, strain-wave gear assemblies typically provide a high torque output relative to their size and weight. This can allow even lightweight robots to execute demanding tasks, such as lifting heavy objects. As yet another feature, strain-wave gear assemblies tend to operate with little or no backlash. Backlash is the clearance or play between gears, which can cause imprecise and jerky movements. By reducing or eliminating backlash, strain-wave gear assemblies can cause robot motions to be more accurate and smoother.

In an actuator with strain-wave gearing, as with other actuators, it is often useful for a robot to sense the torque at the actuator. Such sensing can facilitate responses to external forces and disturbances. For example, when a robot detects deviations or unexpected loads via torque sensing, it can use that information to react in a manner that restores or otherwise promotes positional accuracy and stability. As another example, a robot that interacts with the environment can use force feedback from such interaction to adjust its movements so as to exert appropriate forces in delicate or sensitive tasks. Among other applications, torque sensing can provide useful feedback related to object grasping and manipulation. From torque measurements at various actuators, a robot can determine if it has successfully grasped an object or if a grasp requires adjustment. Furthermore, a robot can use torque measurements to control the amount of force it applies to an object during grasping and manipulation, such as to avoid damaging a fragile object. As yet another application, torque sensing can facilitate fault detection and diagnostics. Comparing expected torque values with actual measured values can reveal deviations indicating potential issues related to performance, mechanical integrity, etc.

For the foregoing and/or for other reasons, it can be useful for an actuator to include both strain-wave gearing and torque sensing. This combination, however, can present certain technical challenges. A common and reliable form of torque sensing involves measuring deformation associated with applied torque via one or more resistors connected to a structure that deforms in response to the applied torque. For example, a resistor can be connected to a slightly compliant output shaft of an actuator such that the resistor elongates when the output shaft twists in response to an applied torque. The elongation can be detected via a bridge circuit and translated into a measurement of applied torque. Unfortunately, this approach involves connecting the resistor or resistors to space-consuming structures that amplify strain and are typically made of steel. In many implementations, providing such structures would be inconsistent with other design considerations, such as a demand for an actuator to be compact and lightweight. In contrast to locating a resistor or resistors for torque sensing on an output shaft of an actuator, locating a resistor or resistors for torque sensing on a flexspline of strain-wave gearing of an actuator can allow for torque sensing without sacrificing compactness and without unduly increasing weight. The relationship between applied torque and deformation of a flexspline, however, is more complex than the relationship between applied torque and deformation of an output shaft.

Strain, deformation, and a torque measurement derived therefrom at a given circumferential portion of a flexspline may change as the flexspline and/or an associated circular spline rotate about an axis during operation of an actuator including the flexspline and the circular spline. This may be the case even when the actuator is under a consistent load. In at least some cases, the change manifests as a ripple with a phase. By way of theory and without wishing to be bound by any particular theory, the ripple may be related to interaction between the flexspline and an associated wave generator. In addition to a flexspline, strain-wave gearing includes a circular spline and a wave generator. The wave generator rotates within the flexspline in response to output from the motor. The portion of the wave generator that interacts with the flexspline is ellipsoid with a major axis and a minor axis perpendicular to one another and both perpendicular to the axis of rotation. As the wave generator rotates, it distends the flexspline along the major axis such that teeth at circumferentially opposite portions of the flexspline along the major axis move into engagement with teeth of the circular spline. At the same time, teeth at circumferentially opposite portions of the flexspline along the minor axis move out of engagement with teeth of the circular spline. The distention of the flexspline and the associated movement of the teeth of the flexspline into and out of engagement with the teeth of the circular spline change the way in which different portions of the flexspline deform in response to an applied torque. Correspondingly, when a strain-measuring resistor or strain-measuring resistors are carried at a flexspline, the frequency of the ripple in the measurements from the resistor or resistors can correspond to the frequency at which the wave generator rotates. Furthermore, a ripple phase of a given measurement can correspond to a circumferential location of a gauge that generates the measurement.

Strain-wave gear assemblies and related devices, systems, and methods in accordance with embodiments of the present technology at least partially address one or more problems or limitations associated with conventional technologies. A strain-wave gear assembly in accordance with a particular embodiment includes bridge circuits that measure strain and deformation via different respective portions of a flexspline circumferentially spaced apart from one another. For example, a first bridge circuit may measure strain and deformation via a first set of four portions of a flexspline circumferentially offset from one another by ninety degrees while a second bridge circuit measures strain and deformation via a second set of four portions of the flexspline circumferentially offset from one another by ninety degrees and circumferentially offset from the first set by 45 degrees. By way of theory and again without wishing to be bound by any particular theory, the circumferential spacing between the respective measurement regions of the first and second bridge circuits may cause respective ripples in measurements from the first and second bridge circuits to at least partially cancel one another. In addition or alternatively, the additional measurement regions associated with using two bridge circuits instead of one may reduce or eliminate other types of sampling errors, such as those associated with imperfect placement of gauges carrying the resistors. For the foregoing and/or one or more other reasons, a combined measurement based at least partially on measurements from both the first and second bridge circuits may be more accurate, precise, stable, and/or otherwise better than a measurement from one of the bridge circuits alone.

Error detection, error mitigation, and robustness are other potential advantages of using multiple bridge circuits to measure strain at a flexspline. For example, deviation between an average measurement from a first bridge circuit and an average measurement from a second bridge circuit may indicate to a monitoring system of a robot that one of the bridge circuits is malfunctioning. In at least some cases, a malfunction in a bridge circuit causes a measurement spike. Accordingly, when a monitoring system detects a large deviation between measurements from two bridge circuits, the measurement farthest from zero can be discarded. In addition or alternatively, the monitoring system may compare measurements from different respective bridge circuits at an actuator to an estimate of torque at the actuator from an estimator that operates on the actuator. Also in addition or alternatively, the monitoring system may use consistency with measurements from sensors at other actuators in the same kinematic chain to determine which bridge circuit is the source of a deviation. In response to identifying a malfunctioning bridge circuit, a control system of the robot can disable the bridge circuit and rely on measurements from the other bridge circuit until the malfunctioning bridge circuit can be repaired. Redundant bridge circuits can be more robust and reliable than single bridge circuits. Accordingly, measurements from redundant bridge circuits may be well suited for use in aspects of robot control in which the consequences for failure are particularly great, such as safety systems.

The foregoing and other features of devices, systems, and methods in accordance with various embodiments of the present technology are further described below with reference to FIGS. 1-13. Although methods, devices, and systems may be described herein primarily or entirely in the context of measuring torque at flexsplines of actuators of mobile robots, other contexts are within the scope of the present technology. For example, suitable features of described methods, devices, and systems can be implemented in the context of stationary robots or in non-robot contexts that call for actuators with strain-wave gearing, such as certain vehicles, pumps, winches, etc. Furthermore, suitable features of described methods, devices, and systems can be implemented in the context of detecting properties other than torque. Still further, suitable features of described methods, devices, and systems can be implemented in the context of actuators including gearing other than strain-wave gearing, such as cycloid gearing. Finally, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Strain-Wave Gear Assemblies

FIG. 1 is an exploded, midline cross-sectional side profile view of an actuator 100 and associated structures in accordance with at least some embodiments of the present technology. The actuator 100 can include a motor 102 and a strain-wave gear assembly 104. The strain-wave gear assembly 104 can include a circular spline 106, a flexspline 108, and wave generator 110 operably associated with one another. FIG. 1 also shows a first link 112 and a second link 114 of a robot including the actuator 100. The actuator 100 can be configured to cause relative rotation between the first and second links 112, 114. The first and second links 112, 114 can be connected to other components (not shown) of the robot, such as other links or other actuators. Alternatively, the first link 112 can be at an end of a kinematic chain and/or the second link 114 can be at an end of a kinematic chain. For example, one of the first and second links 112, 114 can be an end effector or a stationary base. In FIG. 1, internal details of the circular spline 106, the flexspline 108, and the wave generator 110 are omitted for clarity. Furthermore, the motor 102, the first link 112, and the second link 114 are shown schematically for clarity.

Force at the actuator 100 can originate at the motor 102. In at least some cases, the motor 102 is an electric motor that receives electricity from a power source (not shown). The motor 102 can rotate the wave generator 110 about an axis of rotation 116. The flexspline 108 can include a collar 118 and a flange 120 connected to the collar 118. The collar 118 can extend circumferentially around the axis of rotation 116 and can define a first cavity 122 configured to receive the wave generator 110. At the collar 118, the flexspline 108 can include first teeth 124 extending outwardly from and distributed circumferentially around the axis of rotation 116. The circular spline 106 can define a second cavity 126 configured to receive a portion of the collar 118 carrying the first teeth 124. The circular spline 106 can include second teeth 128 extending inwardly toward and distributed circumferentially around the axis of rotation 116.

As discussed above, the wave generator 110 can define major and minor axes (not shown) perpendicular to one another and both perpendicular to the axis of rotation 116. When the wave generator 110 is received at the first cavity 122, the collar 118 can resiliently distend slightly along the major axis. This can cause the first and second teeth 124, 128 at regions of an interface between the flexspline 108 and the circular spline 106 at opposite ends of the major axis to be in engagement while the first and second teeth 124, 128 at other regions of the interface at opposite ends of the minor axis are out of engagement. As the wave generator 110 rotates, the regions of the interface at which the first and second teeth 124, 128 are in and out of engagement can migrate about the axis of rotation 116. A difference between a total number of the first teeth 124 and a total number of the second teeth 128 can cause relative rotation between the flexspline 108 and the circular spline 106 at a much lower rate than a rate of relative rotation between the flexspline 108 and the wave generator 110. As shown in FIG. 1, the flexspline 108 can define first mounting holes 130 through which the actuator 100 is connected to the first link 112. Similarly, the circular spline 106 can include second mounting holes 132 through which the actuator 100 is connected to the second link 114. Relative rotation between the flexspline 108 and the circular spline 106 can cause relative rotation between the first and second links 112, 114 via these connections.

In operation, the flexspline 108 can deform resiliently in response to outward pressure from the wave generator 110 and in response to an applied torque. Portions of the collar 118 and the flange 120 can be relatively compliant to accommodate this deformation. In the illustrated embodiment, the flange 120 extends outwardly from the axis of rotation 116 relative to the collar 118. Furthermore, a flexible portion of the flange 120 is radially inward from the first mounting holes 130 relative to the axis of rotation 116. This configuration is sometimes referred to as a "silk hat"

configuration. In other embodiments, the flexible portion of a counterpart of the flange 120 extends inwardly from the axis of rotation 116 relative to the collar 118. Furthermore, a flexible portion of this counterpart of the flange 120 can be radially outward from the first mounting holes 130 relative to the axis of rotation 116. This configuration is sometimes referred to as a "cup" configuration. It should be understood that, unless stated otherwise, suitable aspects of the present technology can be implemented in the context of "silk hat" flexsplines and in the context of "cup" flexsplines.

Figure 2:
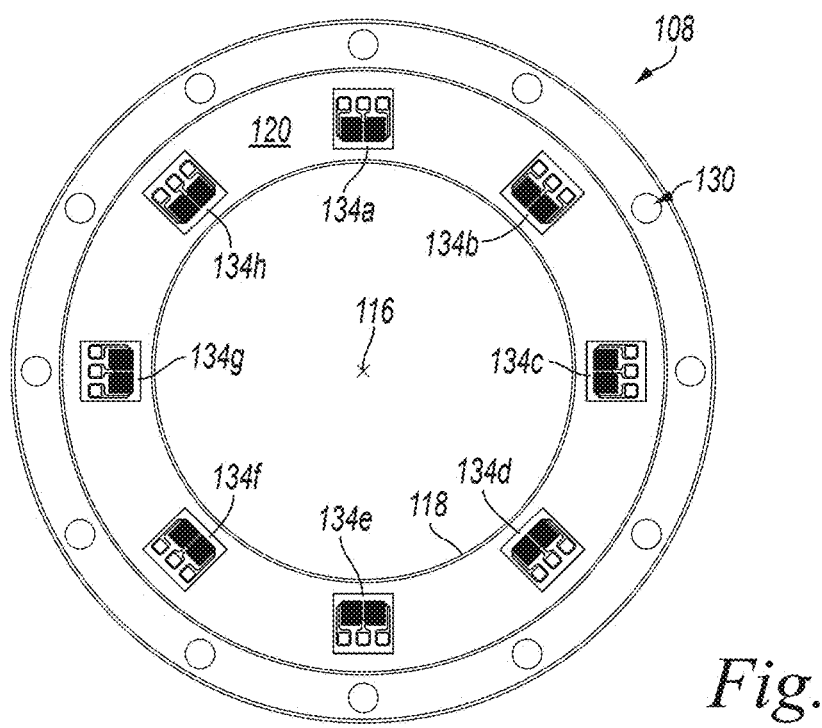
FIG. 2 is rear profile view of a flexspline of a strain-wave gear assembly of the actuator of FIG. 1.

FIG. 2 is rear profile view of the flexspline 108. As shown in FIG. 2, the strain-wave gear assembly 104 can include strain gauges 134 (individually identified as strain gauges 134a-134h) circumferentially distributed about the axis of rotation 116. In the illustrated embodiment, the flexspline 108 carries the strain gauges 134 at a side of the flange 120 facing away from the collar 118. In other embodiments, the strain gauges 134 can have other suitable locations. For example, a counterpart of the flexspline 108 can carry the strain gauges 134 at a side of the flange 120 facing toward the collar 118. As another example, a counterpart of the flexspline 108 can carry the strain gauges 134 at an inside surface of the collar 118 between the flange 120 and the first teeth 124. As yet another example, a counterpart of the flexspline 108 can carry the strain gauges 134 at an outside surface of the collar 118 between the flange 120 and the first teeth 124. Combinations of the foregoing locations for the strain gauges 134 are also possible. Furthermore, the strain gauges 134a-134h can have a variety of suitable forms. One such form is described below with reference to FIG. 3. In general, the strain gauges 134a-134h can be configured to generate an electrical signal in response to deformation of an underlying portion of the flexspline 108.

Figure 3:
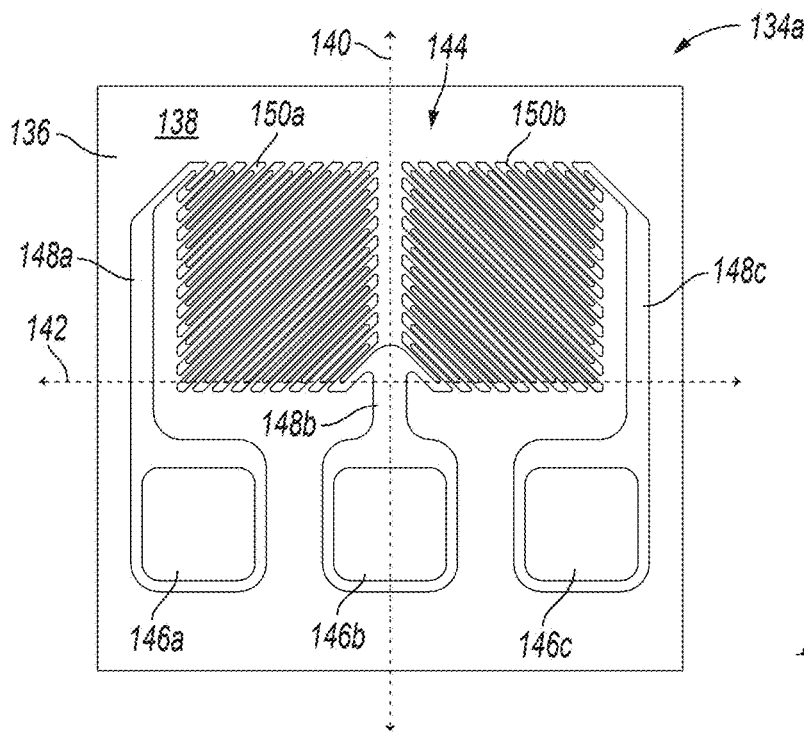
FIG. 3 is an enlarged profile view of a strain gauge of the strain-wave gear assembly of the actuator of FIG. 1.

FIG. 3 is an enlarged profile view of the strain gauge 134a. In at least some cases, the strain gauges 134b-134h have the same features as the strain gauge 134a. As shown in FIG. 3, the strain gauge 134a can include a flexible sheet 136 having a first major surface 138 and an opposite second major surface (not shown) and can define a thickness (also not shown) therebetween. The strain gauge 134a can further define a first axis 140 and a second axis 142 perpendicular to one another and both parallel to the first major surface 138. At the first major surface 138, the strain gauge 134a can include electrical components, such as printed electrical components. The thicknesses of the flexible sheet 136 and of the electrical components can be very small. For example, an average combined thickness of the flexible sheet 136 and the electrical components can be within a range from 0.5% to 5% of an average overall dimension of the strain gauge 134a along the first axis 140 or along the second axis 142. Among the electrical components, the strain gauge 134a can include (and the flexible sheet 136 can carry) a resistor 144, contact pads 146 (individually identified as contact pads 146a-146c), and connectors 148 (individually identified as connectors 148a-148c). The resistor 144 can include two distinct resistive regions 150 (individually identified as resistive regions 150a, 150b). The connector 148a can electrically connect the contact pad 146a and the resistive region 150a. The connector 148b can electrically connect the contact pad 146b and the resistive regions 150a, 150b and can electrically connect the resistive regions 150a, 150b to one another. Finally, the connector 148c can electrically connect the contact pad 146c and the resistive region 150b.

With reference to FIGS. 1-3 together, the strain gauges 134 can be part of a system that detects deformation of the flexspline 108. The flexible sheets 136 can be connected (e.g., adhesively connected) to the flange 120 such that deformation of the flange 120 transfers through the flexible sheets 136 to the resistor 144. The resistive regions 150a, 150b can include a long conductor arranged in a pattern that tends to cause the conductor to elongate in response to this deformation. In the illustrated case, the pattern is serpentine with a primary length of the conductor disposed along parallel lines offset from the first axis 140 by 45 degrees in one direction for the resistive region 150a and in the opposite direction for the resistive region 150b. This basic form can be referred to as a "shear rosette" because it tends to be well suited to measuring shear strains in a diaphragm associated with applied torque. In other cases, counterparts of the resistive regions 150 can include conductors with other suitable patterns. Furthermore, counterparts of the resistors 144 can have a single distinct resistive region or more than two distinct resistive regions. With reference again to the illustrated embodiment, the contact pads 146a-146c can be configured to facilitate making electrical connections between the resistors 144 of different ones of the strain gauges 134a-134h and between the resistors 144 and higher-level electrical components. For example, solder balls (not shown) can be present on the contact pads 146a-146c to electrically connect the resistors 144 via flexible wiring (also not shown).

Figure 4:
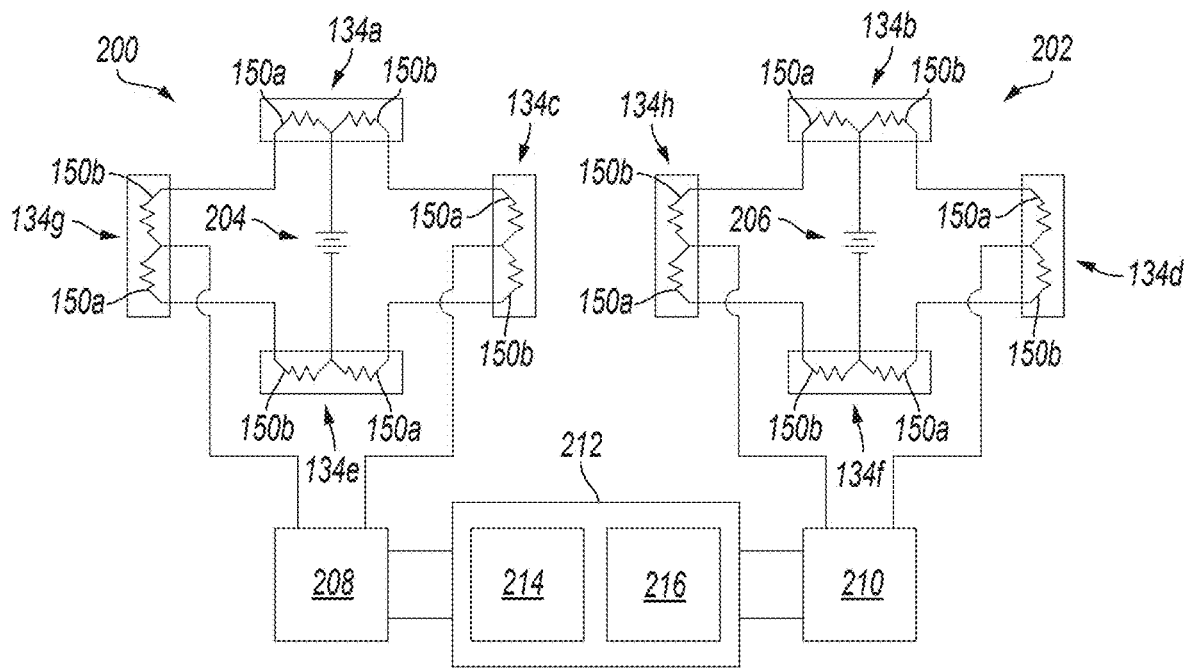
FIG. 4 is a partially schematic circuit diagram corresponding to first and second bridge circuits and associated electrical components of the strain-wave gear assembly of the actuator of FIG. 1.

The strain gauges 134 can form two or more bridge circuits. In a bridge circuit, electrical components are interconnected in a manner that creates parallel branches. Bridge circuits are useful at least in part because a difference in the respective electrical properties of these branches can be measured precisely. Moreover, a bridge circuit can be structured such that this difference corresponds predictably to a value targeted for measurement and, therefore, can be used as a basis for measuring that value. FIG. 4 is a partially schematic circuit diagram corresponding to a first bridge circuit 200, a second bridge circuit 202, and associated electrical components of the strain-wave gear assembly 104. As shown in FIG. 4, the first and second bridge circuits 200, 202 can be full wheatstone bridge circuits. Furthermore, the first and second bridge circuits 200, 202 can be electrically independent of one another. The strain-wave gear assembly 104 can further include a first power source 204 electrically connected to the first bridge circuit 200. Likewise, the strain-wave gear assembly 104 can include a second power source 206 electrically connected to the second bridge circuit 202. In at least some cases, failure of one of the first and second power sources 204, 206 does not prevent operation of the other of the first and second power sources 204, 206. In other embodiments, the first and second bridge circuits 200, 202 can have other suitable forms. For example, a counterpart of one or both of the first and second bridge circuits 200, 202 can be a half wheatstone bridge circuit. As another example, a counterpart of one or both of the first and second bridge circuits 200, 202 can be a quarter wheatstone bridge circuit. Furthermore, counterparts of the first and second bridge circuits 200, 202 can be based on a relationship between deformation of the flexspline 108 and an electrical property other than resistance. Examples of alternative electrical components that can be incorporated into counterpart bridge circuits to measure deformation of the flexspline 108 include piezoelectric components, capacitors, and inductors.

With reference to FIGS. 2-4 together, the first bridge circuit 200 can include the electrical components of the strain gauges 134a, 134c, 134e, 134g. The second bridge circuit 202 can include the electrical components of the strain gauges 134b, 134d, 134f, 134h. In another embodiment, a counterpart of the first bridge circuit 200 includes a selection of the electrical components of the strain gauges 134a-134h and a counterpart of the second bridge circuit 202 includes a different selection of the electrical components of the strain gauges 134a-134h. For example, a counterpart of the first bridge circuit 200 can include the resistive regions 150a of the strain gauges 134a-134h and a counterpart of the second bridge circuit 202 can include the resistive regions 150b of the strain gauges 134a-134h. In these and other cases, counterparts of the resistors 144 can be distributed among multiple flexible sheets 136. The respective locations and orientations of the resistive regions 150a, 150b in the first and second bridge circuits 200, 202 can be selected to cancel normal strains and to amplify shear strains. In at least some cases, the first and second bridge circuits 200, 202 individually include branches that are bilaterally symmetrical with respect to the positions of the constituent resistors 144. Depending on how the first and second bridge circuits 200, 202 are arranged, one of the contact pads 146a-146c (as an upstream contact pad) can be arranged in series with one of the resistors 144a, 144b and another of the contact pads 146a-146c (as a downstream contact pad).

The first and second bridge circuits 200, 202 can be configured to generate a first electrical signal and a second electrical signal, respectively. As discussed below, the first and second electrical signals can correspond to strain at different portions of flexspline 108. Thus the first and second bridge circuits 200, 202 can be part of different respective strain sensors of the strain-wave gear assembly 104. As additional components of these sensors, the strain-wave gear assembly 104 can include a first filter 208 and a second filter 210 configured to process output from the first bridge circuit 200 and the second bridge circuit 202, respectively. Other downstream components also can be included, such as amplifiers, comparators (e.g., for generating error signals), etc. After independent processing, if any, the first and second electrical signals from the first and second bridge circuits 200, 202 can be received at a computing system 212 of the strain-wave gear assembly 104. The computing system 212 can include a processor 214 and memory 216 storing instructions that, when executed via the processor, cause certain operations involving the first and second electrical signals. Examples of these operations are discussed below with reference to FIGS. 12 and 13. Among other things, the computing system 212 can generate torque measurements based at least partially on the first and second electrical signals.

Figure 5:
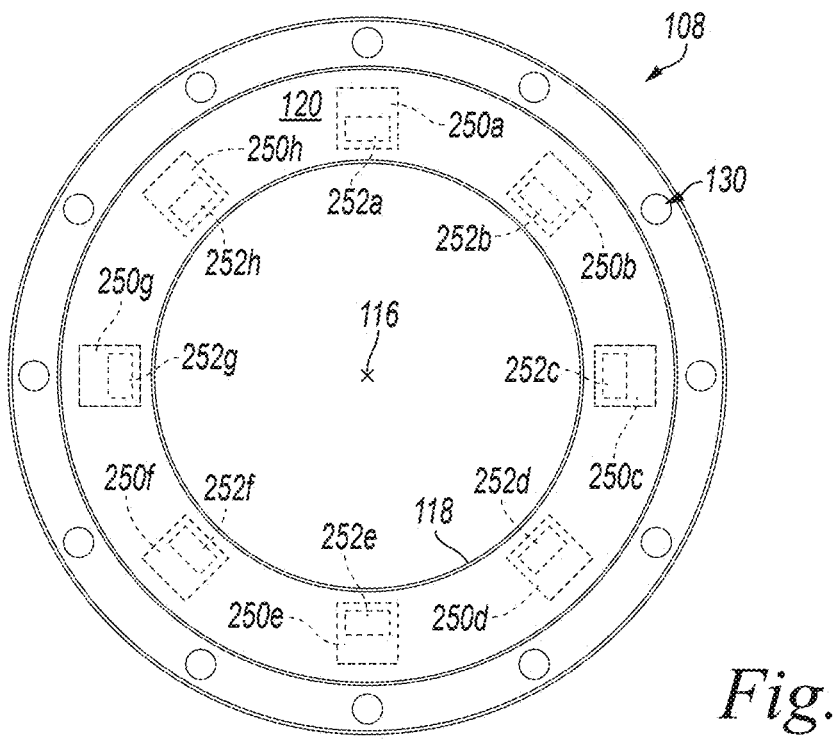
FIG. 5 is rear profile view of the flexspline of the strain-wave gear assembly of the actuator of FIG. 1 with strain gauges of the strain-wave gear assembly omitted and with portions of the flexspline underlying the strain gauges indicated.

FIG. 5 is rear profile view of the flexspline 108 with the strain gauges 134 omitted and with portions of the flexspline 108 underlying the strain gauges 134 indicated. These portions can include first footprints 250 (individually identified as first footprints 250a-250h) underlying the flexible sheets 136 of the strain gauges 134a-134h and second footprints 252 (individually identified as second footprints 252a-252h) underlying the resistors 144 of the strain gauges 134a-134h. The flexible sheets 136 can be oriented on the flange 120 such that the resistors 144 are between the contact pads 146 and the axis of rotation 116. By way of theory and without wishing to be bound by any particular theory, shear strain on the flexspline 108 may scale with the inverse square of radius. Accordingly, locating the resistors 144 closer to the axis of rotation 116 can cause the strain gauges 134 to be more sensitive. Relatedly, the illustrated orientation of the strain gauges 134 can promote greater precision in the correlation between electrical signals from the first and second bridge circuits 200, 202 and torque at the flange 120 and/or have one or more other advantages over other orientations. It should be noted, however, that the flexible sheets 136 can have another suitable orientation on the flange 120 in other embodiments, such as one in which the contact pads 146 are between the resistors 144 and the axis of rotation 116. Moreover, not all of the flexible sheets 136 necessarily have the same orientation on the flange 120. For example, respective orientations of the flexible sheets 136 can alternate circumferentially about the axis of rotation 116 between the foregoing examples.

With reference again to the illustrated embodiment, the first and second bridge circuits 200, 202 can be configured to measure deformation at portions of the flange 120 arranged to reduce or eliminate one or more sources of imprecision in the relationship between electrical signals from the first and second bridge circuits 200, 202 and torque at the flange 120. By way of theory and again without wishing to be bound by any particular theory, measuring deformation via the first and second bridge circuits 200, 202 at circumferentially interspersed portions of the flange 120 can at least partially cancel a ripple that would otherwise be present in a measurement of torque at the flange 120. This ripple can be at least partially due to deformation that is not circumferentially uniform about the axis of rotation 116 and is not directly associated with applied torque. One potential example is deformation associated with distension of the flexspline 108 along the major axis of the wave generator 110.

The use of both the first bridge circuit 200 and the second bridge circuit 202, rather than only the first bridge circuit 200 or only the second bridge circuit 202, to measure deformation and torque at a flexspline 108 can enhance the quality (e.g., the accuracy and/or precision) of this measurement. Moreover, the circumferential spacing among the resistors 144 of the first bridge circuit 200, among the resistors 144 of the second bridge circuit 202, and between the resistors 144 of the first bridge circuit 200 and the resistors 144 of the second bridge circuit 202 can be relevant to this enhancement. FIGS. 6-9 highlight these and other features of the strain-wave gear assembly 104. In particular, FIGS. 6-9 are rear profile views of the flexspline 108 with the strain gauges 134 omitted and with selected portions of the flexspline 108 and circumferential spacings about the axis of rotation 116 indicated. The circumferential positions of the resistors 144 as described herein can be circumferential midpoints of the resistors 144. Thus, the circumferential position of a resistor 144 can be between the resistive regions 150a, 150b of the resistor 144 or even between flexible sheets 136 carrying constituent resistive regions 150a, 150b when a counterpart of a resistor 144 spans multiple flexible sheets 136.

Figure 6:
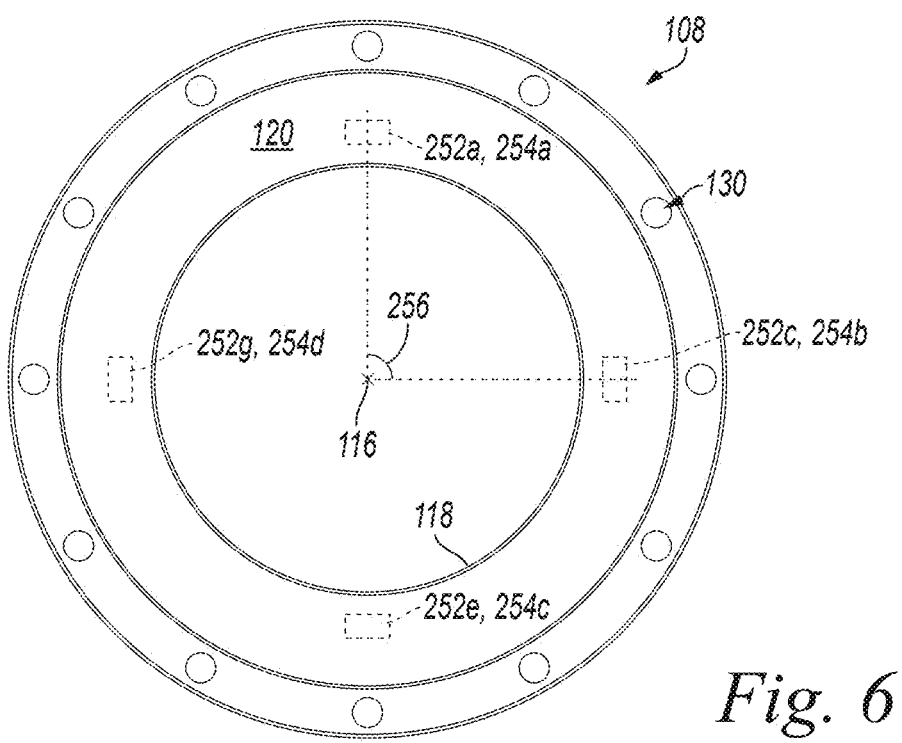
FIG. 6 is rear profile view of the flexspline of the strain-wave gear assembly of the actuator of FIG. 1 with strain gauges of the strain-wave gear assembly omitted and with portions of the flexspline underlying first resistors of a first bridge circuit of the strain-wave gear assembly and a circumferential spacing between the first resistors indicated.
Figure 7:
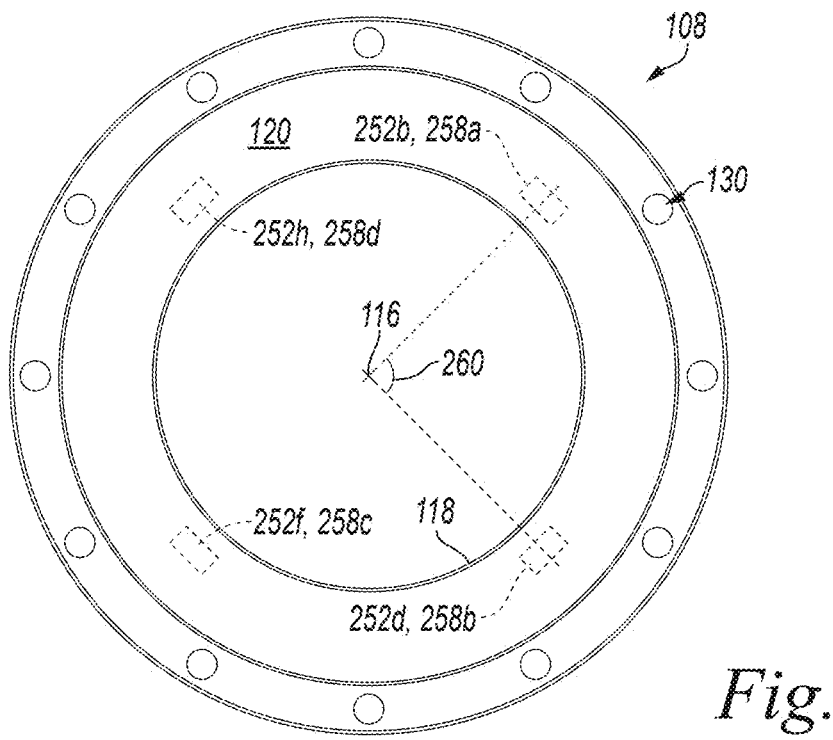
FIG. 7 is rear profile view of the flexspline of the strain-wave gear assembly of the actuator of FIG. 1 with strain gauges of the strain-wave gear assembly omitted and with portions of the flexspline underlying second resistors of a second bridge circuit of the strain-wave gear assembly and a circumferential spacing between the second resistors indicated.

FIG. 6 shows first portions 254 (individually identified as first portions 254a-254d) of the flexspline 108 underlying selected resistors 144 of the first bridge circuit 200 and corresponding to the second footprints 252a, 252c, 252e, 252g. FIG. 6 also shows a first circumferential offset 256 about the axis of rotation 116 between the first portions 254a, 254b of the flexspline 108. The first circumferential offset 256 can also be (e.g., on average) a circumferential spacing about the axis of rotation 116 between other neighboring pairs of the first portions 254a-254d of the flexspline 108. In at least some cases, the first circumferential offset 256 is within a range from 50 degrees to 180 degrees, such as within a range from 60 degrees to 120 degrees. For example, the first circumferential offset 256 can be about 90 degrees. FIG. 7 shows second portions 258 (individually identified as second portions 258a-258d) of the flexspline 108 underlying selected resistors 144 of the second bridge circuit 202 and corresponding to the second footprints 252b, 252d, 252f, 252h. FIG. 6 also shows a second circumferential offset 260 about the axis of rotation 116 between the second portions 258a, 258b of the flexspline 108. The second circumferential offset 260 can also be (e.g., on average) a circumferential spacing about the axis of rotation 116 between other neighboring pairs of the second portions 258a-258d of the flexspline 108. In at least some cases, the second circumferential offset 260 is within a range from 50 degrees to 180 degrees, such as within a range from 60 degrees to 120 degrees. For example, the second circumferential offset 260 can be about 90 degrees.

Figure 8:
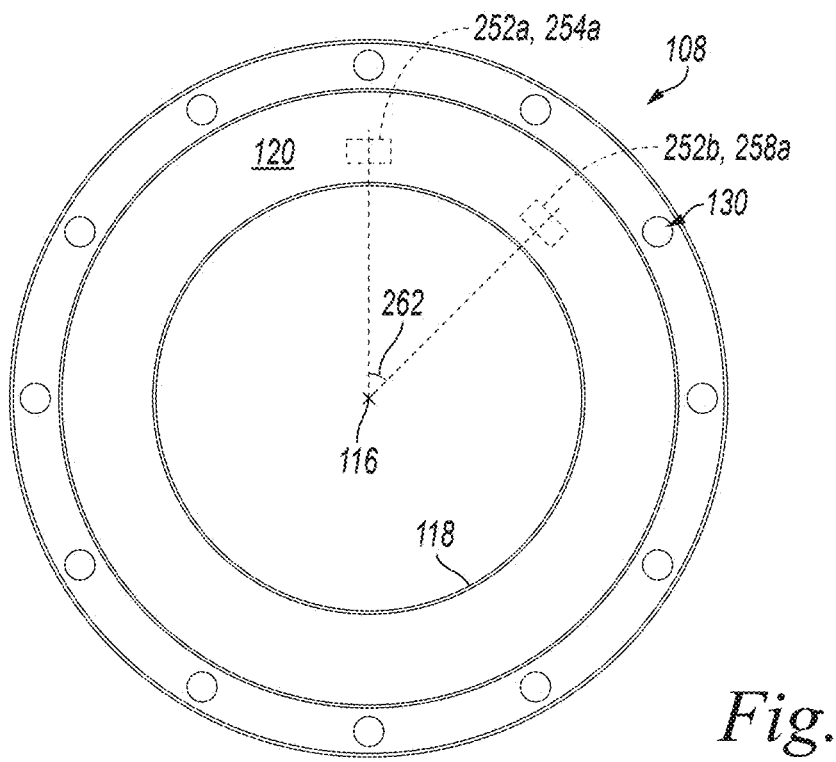
FIG. 8 is rear profile view of the flexspline of the strain-wave gear assembly of the actuator of FIG. 1 with strain gauges of the strain-wave gear assembly omitted and with selected portions of the flexspline underlying the first and second resistors of the first and second bridge circuits, respectively, of the strain-wave gear assembly and a circumferential spacing therebetween indicated.
Figure 9:
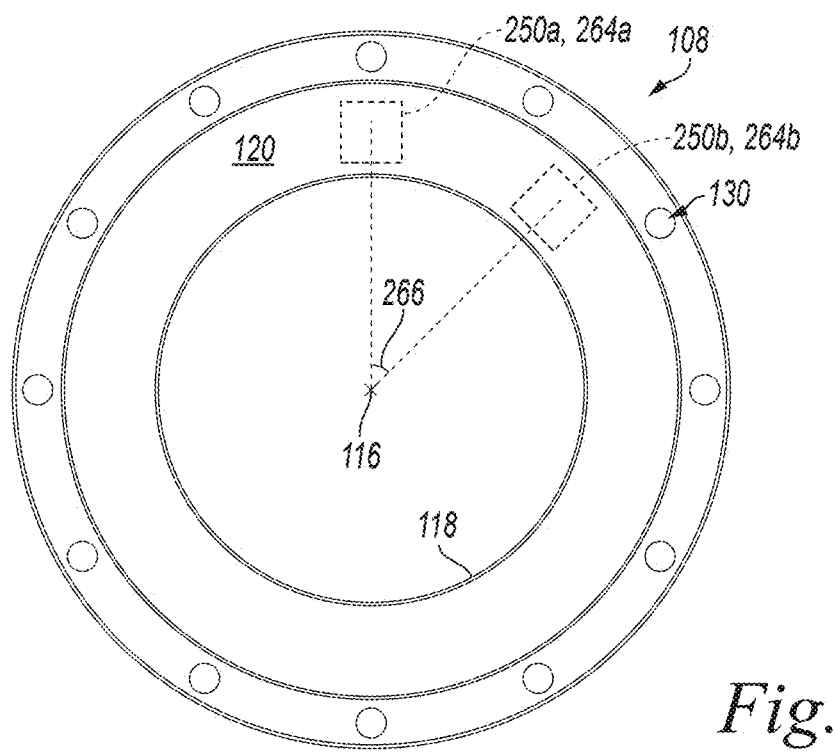
FIG. 9 is rear profile view of the flexspline of the strain-wave gear assembly of the actuator of FIG. 1 with strain gauges of the strain-wave gear assembly omitted and with selected portions of the flexspline underlying circumferentially neighboring flexible sheets of the strain-wave gear assembly and a circumferential spacing between the flexible sheets indicated.

FIG. 8 shows a third circumferential offset 262 between the first portion 254a of the flexspline 108 and the second portion 258a of the flexspline 108. The third circumferential offset 262 can also be (e.g., on average) a circumferential spacing about the axis of rotation 116 between the first portions 254a-254d of the flexspline 108 and neighboring ones of the second portions 258a-258d of the flexspline 108. In at least some cases, the third circumferential offset 262 is within a range from 15 degrees to 75 degrees, such as within a range from 35 degrees to 55 degrees. For example, the third circumferential offset 262 can be about 45 degrees. FIG. 9 shows third portions 264 (individually identified as third portions 264a-264d) of the flexspline 108 underlying flexible sheets 136 of the strain gauges 134a, 134b and corresponding to the first footprints 250a, 250b. FIG. 9 also shows a fourth circumferential offset 266 between the third portions 264a, 264b of the flexspline 108. The fourth circumferential offset 266 can also be (e.g., on average) a circumferential spacing about the axis of rotation 116 between other portions of the flexspline 108 underlying the flexible sheets 136 of neighboring pairs of the strain gauges 134a-134h. In at least some cases, the fourth circumferential offset 266 is within a range from 15 degrees to 75 degrees, such as within a range from 35 degrees to 55 degrees. For example, the fourth circumferential offset 266 can be about 45 degrees.

Figure 10:
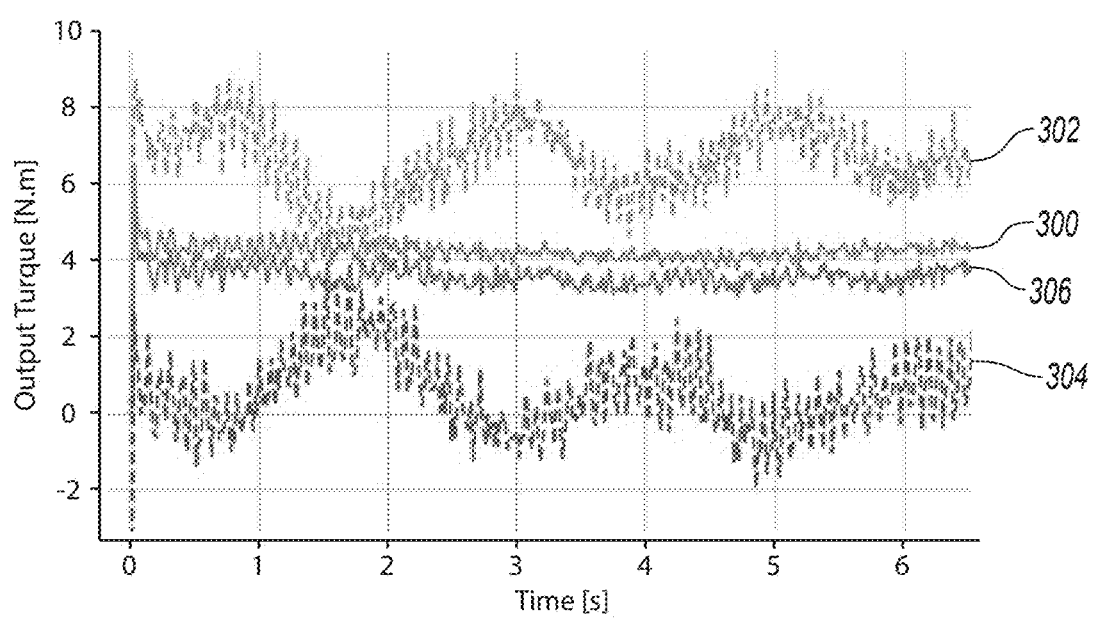
FIG. 10 is a plot of output torque over a period of time for an actuator corresponding to the actuator of FIG. 1 in an experiment illustrating aspects of at least some embodiments of the present technology.

FIG. 10 is a plot of output torque over a period of time for an actuator corresponding to the actuator 100 in an experiment illustrating aspects of at least some embodiments of the present technology. The plot includes a first line 300 corresponding to a torque the tested actuator measured via an independent gauge. The plot also includes second line 302 corresponding to a first electrical signal from a first bridge circuit corresponding to the first bridge circuit 200 and a third line 304 corresponding to a second electrical signal from a second bridge circuit corresponding to the second bridge circuit 202. Finally, the plot includes a fourth line 306 corresponding to an average of the first and second electrical signals. As shown in FIG. 10, the second and third lines 302, 304 exhibit ripples with opposite or nearly opposite respective phases. The fourth line 306, however, is relatively free of phased variation and is much closer to the reference (the first line 300) than either of the second and third lines 302, 304. This experiment demonstrated that, in at least some cases, data from multiple bridge circuits measuring deformation of a flexspline at multiple circumferentially spaced apart positions can be combined to enhance the quality of the measurement. This enhancement can include at least partially canceling a ripple and/or decreasing deviation from a reference.

Examples of Robot Systems

Figure 11:
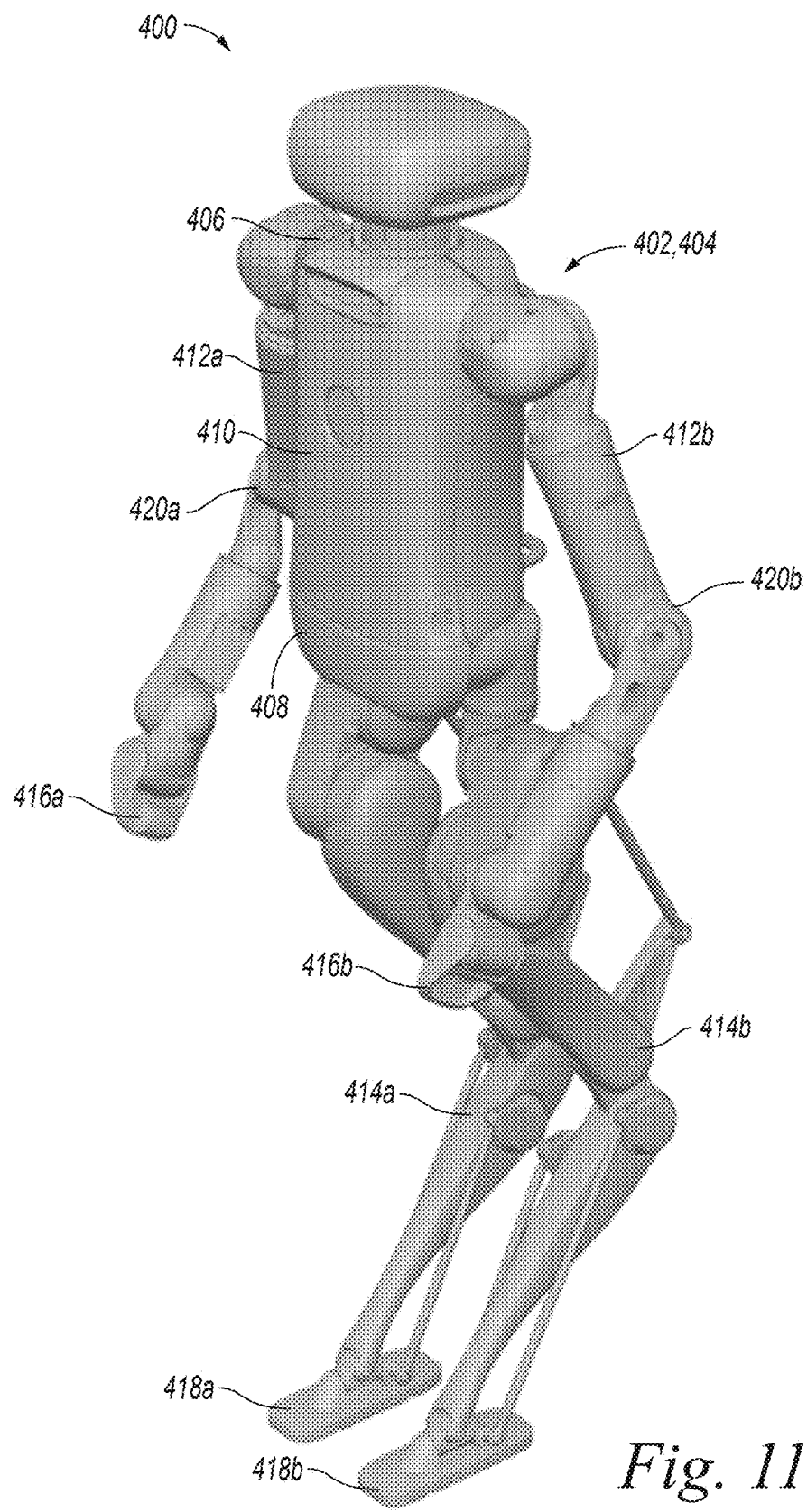
FIG. 11 is a perspective view of a robot including the actuator of FIG. 1.

FIG. 11 is a perspective view of a robot 400 including the actuator 100. As shown in FIGS. 1-3, the robot 400 can include structures resembling human anatomy with respect to the features, positions, and/or other characteristics of such structures. In at least some cases, the robot 400 defines a midsagittal plane about which the robot 400 is bilaterally symmetrical. In these and other cases, the robot 400 can be configured for bipedal locomotion similar to that of a human. Counterparts of the robot 400 can have other suitable forms and features. For example, a counterpart of the robot 400 can have a non-humanoid form, such as a canine form, an insectoid form, an arachnoid form, or a form with no animal analog. Furthermore a counterpart of the robot 400 can be asymmetrical or have symmetry other than bilateral. Still further, a counterpart of the robot 400 can be configured for non-bipedal locomotion. For example, a counterpart of the robot 400 can be configured for another type of legged locomotion (e.g., quadrupedal locomotion, octopedal locomotion, etc.) and/or non-legged locomotion (e.g., wheeled locomotion, continuous-track locomotion, etc.).

The robot 400 can include a centrally disposed body 402 through which other structures of the robot 400 are interconnected. As all or a portion of the body 402, the robot 400 can include a torso 404 having a superior portion 406, an inferior portion 408, and an intermediate portion 410 therebetween. The robot 400 can further include articulated appendages carried by the torso 404. Among these articulated appendages, the robot 400 can include arms 412a, 412b and legs 414a, 414b. In at least some cases, the robot 400 is configured to manipulate objects via the arms 412a, 412b, such as bimanually. In these and other cases, the robot 400 can be configured to ambulate via the legs 414a, 414b, such as bipedally. The arms 412a, 412b and the legs 414a, 414b can define kinematic chains. The kinematic chains corresponding to the arms 412a, 412b, for example, can provide at least five degrees of freedom, such as exactly five or exactly six degrees of freedom. In these and other cases, the kinematic chains corresponding to the legs 414a, 414b can provide at least four degrees of freedom, such as exactly four, exactly five, or exactly six degrees of freedom. As parts of the arms 412a, 412b, the robot 400 can include end effectors 416a, 416b at distalmost portions of the corresponding kinematic chains. Similarly, as parts of the legs 414a, 414b, the robot 400 can include feet 418a, 418b at distalmost portions of the corresponding kinematic chains. In the illustrated embodiment, the end effectors 416a, 416b and the feet 418a, 418b are not articulated. In other embodiments, counterparts of some or all of the end effectors 416a, 416b and the feet 418a, 418b can be articulated, such as with one or more movable fingers or toes.

At the individual articulations of the arms 412a, 412b and legs 414a, 414b, the robot 400 can include a joint and a corresponding actuator. At least one of these actuators can correspond to the actuator 100. For example, the robot 400 can include actuators with strain-wave gearing and torque sensing in accordance with at least some embodiments of the present technology at joints of the arms 412a, 412b, at joints of the legs 414a, 414b, and/or elsewhere. In a particular example, the robot 400 includes elbow joints 420a, 420b at or near midpoints along lengths of the respective arms 412a, 412b. The robot 400 can include actuators corresponding to the actuator 100 at the respective elbow joints 420a, 420b. The combination of strain-wave gearing and torque sensing in a compact form can be useful in many other locations in addition or alternatively. Furthermore, the robot 400 is merely one example of a system in which features of at least some embodiments of the present technology can be implemented.

Examples of Electrical, Computer, and Software Systems

Figure 12:
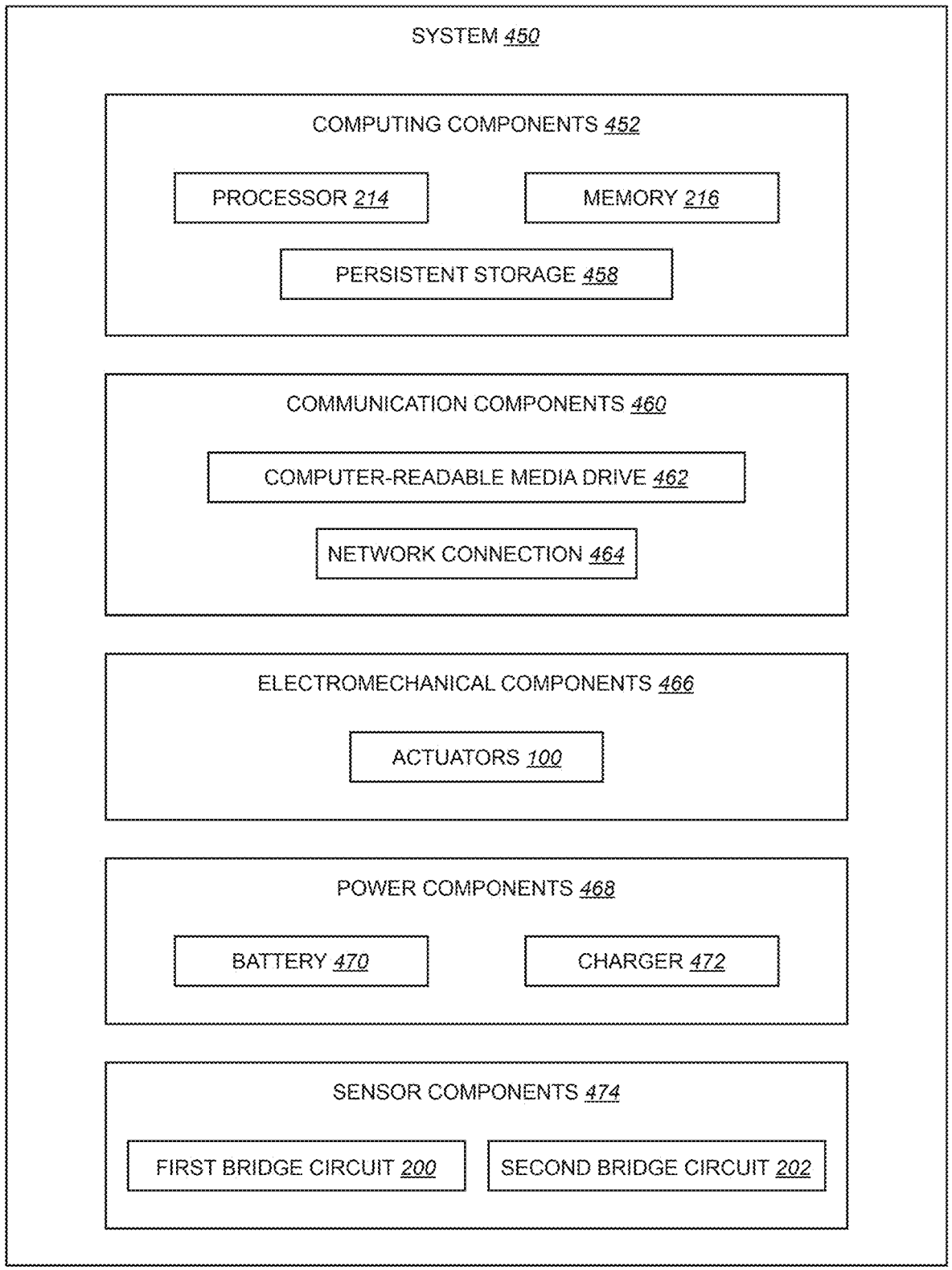
FIG. 12 is a block diagram corresponding to a system including electrical, computer, and software components of the robot including the actuator of FIG. 1.

When suitable, operations described elsewhere in this disclosure (e.g., data operations, movements of the robot 400, measurements via the first and second bridge circuits 200, 202, etc.) can be implemented at least partially via the electrical, computer, and software devices and systems disclosed in this section. FIG. 12 is a block diagram corresponding to a system 450 including electrical, computer, and software components of the robot 400. As shown in FIG. 12, the system 450 can include computing components 452. The computing components 452 can include the processor 214 and the memory 216 discussed above with reference to FIG. 4. The processor 214 can be one or more general-purpose and/or special-purpose integrated circuits including digital logic gates for executing programs and/or for otherwise processing data. The memory 216 can be one or more integrated circuits for storing data in use. The memory 216 can include a multithreaded program, an operating system including a kernel, device drivers, etc. The computing components 452 can further include persistent storage 458, such as a hard drive for persistently storing data. Examples of data that can be stored by the persistent storage 458 include diagnostic data, sensor data, configuration data, environmental data, and current-state data. The computing components 452 can collectively define a computer configured to manage, control, receive information from, deliver information to, and/or otherwise usefully interact with other components of the system 450.

The system 450 can further include communication components 460. The communication components 460 can include a computer-readable media drive 462 for reading computer programs and/or other data stored on computer-readable media. As one example, the computer-readable media drive 462 can be a flash-memory drive. The communication components 460 can further include a network connection 464 for connecting the robot 400 to other devices and systems, such as other robots and/or other computer systems. The network connection 464 can be wired and/or wireless and can be via the Internet, a Local Area Network (LAN), a Wide Area Network (WAN), Bluetooth®, WiFi®, a cell phone network, etc. The network connection 464 can include networking hardware, such as routers, switches, transmitters, receivers, computer-readable transmission media, etc. The communication components 460 can further include a display and/or other suitable components for communicating with a user. The robot 400 can use the communication components 460 for internal operations and/or to interact with devices and/or systems external to the robot 400, such as systems for providing contextual information about the environment in which the robot 400 operates and/or systems for changing operating conditions of the robot 400.

The system 450 can further include electromechanical components 466. The electromechanical components 466 can include the actuators 100 discussed above and/or other suitable components for implementing mechanical action within the robot 400. The system 450 can further include power components 468. The power components 468 can include a battery 470 and a charger 472. The battery 470 can be a lithium-ion battery, a lead-acid battery, or a battery of another suitable type. The charger 472 can include a connector (not shown) compatible with a power source (e.g., a wall outlet) and leads (also not shown) extending between the connector and the battery 470. In at least some cases, the robot 400 is configured to operate wirelessly via the battery 470 and to recharge occasionally via the charger 472.

Finally, the system 450 can include sensor components 474 for capturing, providing, and/or analyzing information about the robot 400 itself and/or the environment in which the robot 400 is operating. The sensor components 474 can include the first and second bridge circuits 200, 202. In addition or alternatively, the sensor components 474 can include a light sensor (e.g., a photoresistor), a sound sensor (e.g., a microphone), a location sensor (e.g., using the Global Positioning System), a two-dimensional sensor, a three-dimensional sensor, and/or a proximity sensor, among other examples. Within the body 402 and/or at one or more other suitable locations, the robot 400 can include among the sensor components 474 an accelerometer, a gyroscope, a magnetometer, and/or a tilt sensor incorporated into an inertial measurement unit (IMU) through which the robot 400 can determine acceleration, angular velocity, and orientation. In at least some cases, the robot 400 includes a sensor that supports or is supported by the first and second bridge circuits 200, 202. For example, the robot 400 can include a contact sensor that generates an indication of contact at least partially in response to data from the first and second bridge circuits 200, 202. The robot 400 may use acquired sensor data as a basis for decision-making via the computing components 452.

Components of the system 450 can be connected to one another and/or to other components of the robot 400 via suitable conductors, transmitters, receivers, circuitry, etc. While the system 450 configured as described above may be used to support operation of the robot 400, it should be appreciated that the robot 400 may be operated using devices of various types and configurations and that such devices may have various components and levels of responsibility. For example, the robot 400 may employ individual computer systems or controllers to manage discrete aspects of its operations, such as an individual computer system or controller to perform computer vision operations, a separate computer system or controller to perform power management, etc. In some cases, the robot 400 employs the system 450 to control physical aspects of the robot 400 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 400 may include any number of mechanical aspects and associated rules, which may be at least partially based on or otherwise configured in accordance with the purpose of and/or functions performed by the robot 400. Furthermore, these aspects and rules can correspond to measurements from the first and second bridge circuits 200, 202. For example, the robot 400 may forgo lifting an object if an attempt at lifting the object causes a torque measurement based at least partially on electrical signals from the first and second bridge circuits 200, 202 to exceed a threshold.

Software features in accordance with at least some embodiments of the present technology may take the form of computer-executable instructions, such as program modules executable by the computing components 452. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python®. The functionality of the program modules may be combined or distributed in various embodiments, including cloud-based implementations, web applications, mobile applications for mobile devices, etc. Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, WAN, or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the actuator 100 and the robot 400 may communicate via any number of wired and/or wireless communication techniques and that elements of the actuator 100 and the robot 400 may be distributed rather than located in a single monolithic entity. Finally, electrical and computing aspects of devices and systems in accordance with various embodiments of the present technology may operate in environments and/or according to processes other than the environments and processes described above.

Examples of Methods

Figure 13:
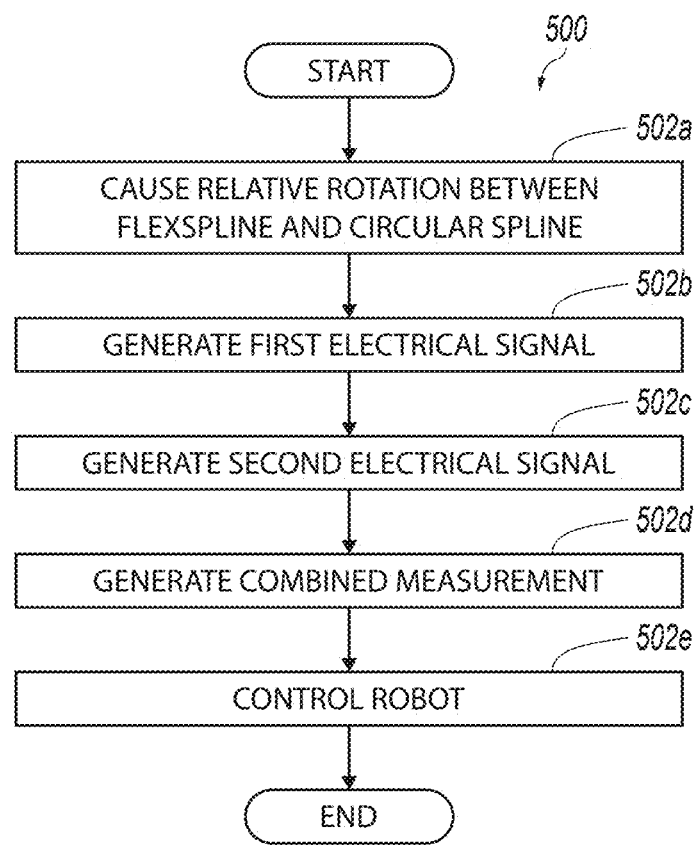
FIG. 13 is a block diagram corresponding to a method involving the actuator of FIG. 1 in accordance with at least some embodiments of the present technology.

FIG. 13 is a block diagram corresponding to a method 500 in accordance with at least some embodiments of the present technology. With reference to FIGS. 1-13 together, the method 500 can include causing relative rotation between the flexspline 108 and the circular spline 106 about the axis of rotation 116 (block 502a). This can occur over a period of time and at least partially as a result of causing relative rotation between the flexspline 108 and the wave generator 110. For example, the method 500 can include rotating the wave generator 110 via the motor 102 to cause the relative rotation between the flexspline 108 and the wave generator 110, which then causes the relative rotation between the flexspline 108 and the circular spline 106. In some cases, the flexspline 108 is stationary during the relative rotation. In other cases, the circular spline 106 is stationary during the relative rotation. In still other cases, neither the flexspline 108 nor the circular spline 106 is stationary during the relative rotation.

With reference again to the illustrated embodiment, the method 500 can further include generating a first electrical signal (block 502b) and generating a second electrical signal (block 502c) over the period of time during the relative rotation between the flexspline 108 and the circular spline 106 about the axis of rotation 116. The first electrical signal can correspond to strain at the first portions 254 of the flexspline 108. Relatedly, generating the first electrical signal can be at least partially in response to deformation of the resistors 144 at the first portions 254 of the flexspline 108. Similarly, the second electrical signal can correspond to strain at the second portions 258 of the flexspline 108. Also similarly, generating the second electrical signal can be at least partially in response to deformation of the resistors 144 at the second portions 258 of the flexspline 108. Generating the first and second electrical signals can be via first and second sensors, respectively, such as via the first and second bridge circuits 200, 202 as respective components of first and second sensors.

In at least some cases, generating the first and second electrical signals occurs simultaneously. In these and other cases, the first and second electrical signals over the period of time and over a corresponding period of rotation can include first and second ripples with first and second phases, respectively. The first and second phases can correspond to relative rotation between the flexspline 108 and the wave generator 110 over the period of time and over the corresponding period of rotation. For example, a difference between the first and second phases can correspond to an angle between the first and second portions of the flexspline 108. The method 500 can further include generating a combined measurement corresponding to torque at the flexspline 108 (block 502d). The combined measurement can be based at least partially on the first and second electrical signals. For example, the combined measurement can be an average corresponding to the first and second electrical signals over the period of time and over the corresponding period of rotation. In at least some cases, combining the first and second electrical signals reduces or eliminates the first and second ripples. Accordingly, the combined measurement can be more accurate and/or precise than it would be if based on either of the first and second electrical signals alone. Finally, the method 500 can include controlling the robot 400 based at least partially on the combined measurement (block 502e).

Although embodiments of the present technology are described primarily or entirely in the context of multiple bridge circuits, not all embodiments include multiple bridge circuits. For example, in an embodiment including a single or multiple bridge circuits carried by a flexspline, direct calibration can be used to at least partially reduce a ripple and/or another type of error that changes in magnitude based on a phase of rotation of the flexspline. In these and other cases, the error and a corresponding angle of rotation can be stored in memory and used to arithmetically correct output from the bridge circuit or circuits. Even with direct calibration, however, the use of multiple bridge circuits may be advantageous, such as for robustness and comparison-based error detection. As another example, a single bridge circuit can be configured to measure strain at a relatively large number of spaced apart locations on a flexspline. Such a bridge circuit can include a number of circumferentially spaced apart gauges, resistor footprints, shear rosettes, etc. greater than 5 (e.g., within a range from 5 to 15) and/or greater than 6 (e.g., within a range from 6 to 12). Such a single bridge circuit can be effective for reducing a ripple and/or another type of error that changes in magnitude based on a phase of rotation of the flexspline while lacking other advantages of multiple bridge circuits such as advantages related to robustness and comparison-based error detection.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in two-dimensional or three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. The headings provided herein are for convenience only. No heading in this disclosure should be interpreted as limiting the scope of the subject matter under such heading. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A strain-wave gear assembly comprising:
   a circular spline, a flexspline, and a wave generator operably associated with one another, wherein:
      relative rotation between the flexspline and the wave generator causes relative rotation between the circular spline and the flexspline about an axis, and
      the flexspline includes:
         a collar extending circumferentially around the axis, and
         a flange connected to the collar and extending outwardly from the axis relative to the collar;
   a first bridge circuit configured to generate a first electrical signal corresponding to strain at a first portion of the flexspline at the flange wherein the first bridge circuit includes a first upstream contact pad, a first resistor, and a first downstream contact pad in series;
   a second bridge circuit configured to generate a second electrical signal corresponding to strain at a second portion of the flexspline at the flange and circumferentially offset from the first portion of the flexspline about the axis, wherein the second bridge circuit includes a second upstream contact pad, a second resistor, and a second downstream contact pad in series;
   a first flexible sheet:
      adhesively connected to the flange,
      carrying the first upstream contact pad, the first resistor, and the first downstream contact pad, and
      oriented on the flange such that the first resistor is between the first upstream contact pad and the axis and such that the first resistor is between the first downstream contact pad and the axis; and
   a second flexible sheet:
      adhesively connected to the flange,
      carrying the second upstream contact pad, the second resistor, and the second downstream contact pad, and
      oriented on the flange such that the second resistor is between the second upstream contact pad and the axis and such that the second resistor is between the second downstream contact pad and the axis.

2. The strain-wave gear assembly of claim 1, wherein the second portion of the flexspline is circumferentially offset from the first portion of the flexspline about the axis by an angle within a range from 15 degrees to 75 degrees.

3. The strain-wave gear assembly of claim 1, wherein the second portion of the flexspline is circumferentially offset from the first portion of the flexspline about the axis by an angle within a range from 35 degrees to 55 degrees.

4. The strain-wave gear assembly of claim 1, wherein:
the first resistor is at the first portion of the flexspline; and
the second resistor is at the second portion of the flexspline.

5. The strain-wave gear assembly of claim 4, wherein the first and second flexible sheets are circumferentially spaced apart from one another about the axis by an angle within a range from 15 degrees to 75 degrees.

6. The strain-wave gear assembly of claim 4, wherein the first and second flexible sheets are circumferentially spaced apart from one another about the axis by an angle within a range from 35 degrees to 55 degrees.

7. The strain-wave gear assembly of claim 1, wherein:
the first bridge circuit is a first wheatstone bridge circuit; and
the second bridge circuit is a second wheatstone bridge circuit.

8. The strain-wave gear assembly of claim 1, wherein the first and second bridge circuits are electrically independent of one another.

9. The strain-wave gear assembly of claim 1, further comprising:
a first power source electrically connected to the first bridge circuit; and
a second power source electrically connected to the second bridge circuit.

10. A flexspline comprising:
a collar extending circumferentially around an axis;
a flange connected to the collar and extending outwardly from the axis relative to the collar;
a first bridge circuit configured to generate a first electrical signal corresponding to strain at a first portion of the flexspline, wherein the first portion of the flexspline is at the flange, and wherein the first bridge circuit includes a first upstream contact pad, a first resistor, and a first downstream contact pad in series;
a second bridge circuit configured to generate a second electrical signal corresponding to strain at a second portion of the flexspline, wherein the second portion of the flexspline is at the flange and is circumferentially offset from the first portion of the flexspline about the axis and wherein the second bridge circuit includes a second upstream contact pad, a second resistor, and a second downstream contact pad in series;
a first flexible sheet:
adhesively connected to the flange,
carrying the first upstream contact pad, the first resistor, and the first downstream contact pad, and
oriented on the flange such that the first resistor is between the first upstream contact pad and the axis and such that the first resistor is between the first downstream contact pad and the axis; and
a second flexible sheet:
adhesively connected to the flange,
carrying the second upstream contact pad, the second resistor, and the second downstream contact pad, and
oriented on the flange such that the second resistor is between the second upstream contact pad and the axis and such that the second resistor is between the second downstream contact pad and the axis.

11. The flexspline of claim 10, wherein the second portion of the flexspline is circumferentially offset from the first portion of the flexspline about the axis by an angle within a range from 15 degrees to 75 degrees.

12. The flexspline of claim 10, wherein the second portion of the flexspline is circumferentially offset from the first portion of the flexspline about the axis by an angle within a range from 35 degrees to 55 degrees.

13. The flexspline of claim 10, wherein:
the first resistor is at the first portion of the flexspline; and
the second resistor is at the second portion of the flexspline.

14. The flexspline of claim 13, wherein the first and second flexible sheets are circumferentially spaced apart from one another about the axis by an angle within a range from 15 degrees to 75 degrees.

15. The flexspline of claim 13, wherein:
the first bridge circuit is a first wheatstone bridge circuit; and
the second bridge circuit is a second wheatstone bridge circuit.

16. The flexspline of claim 13, wherein the first and second flexible sheets are circumferentially spaced apart from one another about the axis by an angle within a range from 35 degrees to 55 degrees.

17. The flexspline of claim 10, wherein the first and second bridge circuits are electrically independent of one another.

18. The flexspline of claim 10, further comprising:
a first power source electrically connected to the first bridge circuit; and
a second power source electrically connected to the second bridge circuit.

\* \* \* \* \*